J. D. HOPWOOD.
CRANKING DEVICE.
APPLICATION FILED NOV. 20, 1912.
1,102,050.
Patented June 30, 1914.
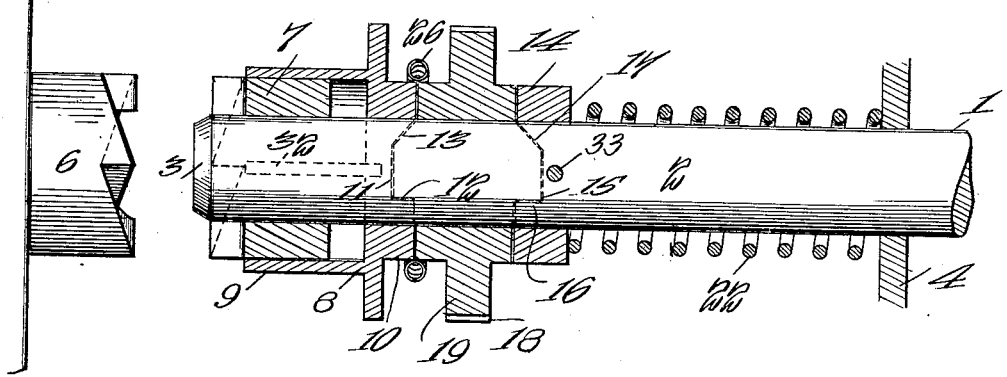

UNITED STATES PATENT OFFICE.

JAMES DANIEL HOPWOOD, OF BIRMINGHAM, ALABAMA, ASSIGNOR OF ONE-THIRD TO JOHN P. RUSSELL, OF JEFFERSON COUNTY, ALABAMA.

CRANKING DEVICE.

1,102,050.  Specification of Letters Patent.  Patented June 30, 1914.

Application filed November 20, 1912.  Serial No. 732,441.

*To all whom it may concern:*

Be it known that I, JAMES DANIEL HOPWOOD, a citizen of the United States, and a resident of Birmingham, in the county of Jefferson and State of Alabama, have invented a new and useful Improvement in Cranking Devices, of which the following is a specification.

My invention is an improvement in cranking devices, and has for its object the provision of a device of the character specified especially adapted for use with automobiles or with explosion engines in general, and wherein means is provided for preventing reverse movement of the crank in case of back firing or the like.

In the drawings:—Figure 1 is a longitudinal section of the crank in place, Fig. 2 is an end view, Fig. 3 is a section on the line of the pawl, and Fig. 4 is a side view of the moving mechanism.

In the present embodiment of the invention, the crank 1 is provided with a shank 2 of considerable length, having its inner end beveled as shown at 3, and a bearing rib 4 is provided for the shank spaced apart from the said beveled end.

The engine shaft is provided with one section 6 of a clutch, and the other section 7 of the clutch is mounted on the shank of the crank. Each of the said sections 6 and 7 is in the form of a collar or sleeve having teeth at one end. Both sections are fixed with respect to the element upon which they are mounted, the section 6 being secured to the engine shaft and the section 7 to the crank.

A collar 8 is mounted on the shaft adjacent to the clutch section 7 and the said collar is provided with an axial sleeve or housing 9, fitting outside of the clutch section 7. The collar 8 is feathered to the clutch section 7, so that while the clutch section may move longitudinally with respect to the collar, the said section and the collar must turn together. The collar 8 is provided with a cam portion 10 at the opposite side of the collar from the housing 9, the said cam portion having a plurality of notches 11 at its edge, each notch having one wall 12 perpendicular to the bottom of the notch, and the other wall 13 being beveled or inclined with respect to the said bottom. A similar cam portion 14 is mounted on the crank in spaced relation to the collar 8, the said cam portion having notches 15, one of whose walls 16 is perpendicular and the other wall 17 is inclined or beveled. It will be noticed from an inspection of the drawing that the notches of the cam portion or sleeve 14 are symmetrical with respect to the notches of the collar 8.

A ratchet wheel 18 is mounted on the crank between the cam portions 10 and 14, and the hub 19 of the said wheel is provided at each of its ends with series 20 and 21 of teeth, fitting the notches of the adjacent cam portions. Each tooth of the series 20 fits a notch of the cam portion 10, while each tooth of the series 21 fits a notch of the cam portion 14.

The arrangement is such, that when the ratchet wheel 18 is turned in one direction, the cam portions 10 and 14 will move therewith for the reason that the perpendicular wall of the said teeth will engage the perpendicular walls of the notches and when the ratchet wheel moves in the opposite direction, the inclined walls of the teeth will engage the inclined walls of the notches, and will slip along the said walls, thus forcing the cam portions 10 and 14 away from the hub of the ratchet wheel.

A coil spring 22 is arranged between the rib 4 and the cam portion or sleeve 14, the spring normally acting to press the crank shaft away from the engine shaft, and a pawl 23 coöperates with the teeth of the ratchet wheel, the said pawl being pivoted at 24 on a fixed support as for instance, the frame of the automobile or the casing of the engine.

The pawl is provided with an angular extension which is split to form lugs 27, and the said lugs are arranged astride of the wheel, one of the lugs being on each face thereof and a fiber pin 28 is arranged in an opening in one of the lugs, the inner end of the said pin frictionally engaging the face of the ratchet wheel. The pin 28 serves a double function acting first to lift and hold the pawl out of contact with the teeth of the ratchet wheel, while the crank is turning forward, thereby eliminating the rattling or tapping of the pawl on the teeth, while when the crank moves backwardly sufficient friction is exerted between the face of the wheel and the pin to cause the pawl to seat and stop the reverse motion of the ratchet wheel. There is just sufficient friction between the engaging end of the pin and the wheel 18 to move the pawl into or out of contact with the teeth of the wheel, in accordance with the direction of motion of the said wheel. When the wheel 18 moves forwardly, the pin 28 moves with the wheel until the pawl is lifted out of contact with the teeth of the wheel, and the continuous engagement of the pin and the wheel holds the pawl so lifted, until the motion of the wheel ceases. At the commencement of reverse movement of the wheel, the pawl is moved in the opposite direction. The arm 27 is rigid with the pawl. A coil spring 25 encircles the pin and normally presses the pin toward the face of the wheel, the said spring being light, causing merely enough friction to cause the pawl to respond to the movement of the wheel. The collar 8 is provided near its periphery with a pin 30 extending longitudinally of the crank, and a similar pin 31 extends from the ratchet wheel 18 toward the collar 8. The said pins are at equal distance from the axis of the crank, so that they will engage when the collar 8 is turned in the reverse direction, the said pins thus limiting the reverse movement of the collar.

A coil spring 26 is arranged between the said pins, the said spring having one end connected with each of the pins, and the said spring partially encircles the cam portion 10 and the adjacent end of the hub of the ratchet wheel, and normally acts to return the ratchet wheel to its normal position as shown in Fig. 1 of the drawing.

In operation, the crank is engaged with the engine shaft axially, and the said crank must be pushed longitudinally of the engine shaft thus compressing the spring 22 until the teeth of the clutch section 7 engage with the teeth of the clutch section 6. The crank is then turned forwardly to start the engine. Should for any reason the engine shaft move in the reverse direction (as for instance, when the engine back fires,) the pawl 23 will prevent reverse movement of the ratchet wheel holding the same, and the reverse movement of the collar 8 will cause the inclined walls 13 of the notches to engage the inclined walls of the teeth, thus forcing the ratchet wheel toward the rib 4. The spring 22 will return the crank shaft to its original position, and out of engagement with the engine shaft as soon as the said crank shaft is released. The cam portion 14 will also be forced toward the said rib for carrying the crank therewith, and the housing will be moved over the clutch section 7. The said housing is of just sufficient length to cover the ends of the teeth of the clutch section when the said section is within the housing. The stops 30—31 are so arranged that they will prevent reverse movement of the collar 8, to no greater extent than sufficient to withdraw the clutch section 7 into the housing. The crank will thus be disengaged from the engine shaft and the spring 26 will at once return the collar 8 to its original position, and the clutch section 7 will again have its teeth extended beyond the edge of the housing 9. The clutch section 7 is pinned to the crank shaft by a pin 32, and the cam portion or sleeve 14 is also pinned to the crank shaft by a pin 33, and it will be evident that when the said sleeve 14 is moved laterally away from the engine shaft, the clutch section 7 will be withdrawn into the housing.

I claim:—

1. The combination with an engine shaft having a clutch section provided with teeth at its outer end, of a starting crank having a clutch section provided with teeth at its outer end for engaging the teeth of the clutch section on the engine shaft, said section being pinned to the crank, a collar on the crank adjacent to the clutch section, said collar having a housing extending over the clutch section and of a length to cover the teeth thereof, said collar having a cam portion at the opposite side from the housing, a cam portion pinned to the crank in spaced relation to the cam portion of the collar, said cam portions having notches, each having one end wall perpendicular to the bottom of the notch and the other end wall inclined to the bottom of the notch, the notches of the cam portions being symmetrical, a ratchet wheel journaled on the crank between the cam portions, said wheel having a hub provided at each end with projections fitting the notches of the adjacent cam portion, a pawl pivoted to a fixed support and engaging the teeth of the ratchet wheel to prevent reverse rotation thereof, interengaging stops on the first-named collar and the ratchet wheel for limiting the reverse motion of the collar with respect to the ratchet wheel, a spring arranged between the stops and acting normally to hold the ratchet wheel with the projections in the notches, a spring arranged between the last-named cam portion and a fixed support and normally pressing the crank away from the engine shaft, and means actuated by the movement of the ratchet wheel for moving the pawl into and out of engagement with the teeth thereof.

2. The combination with an engine shaft having a clutch section provided with teeth at its outer end, of a starting crank having a clutch section provided with teeth at its outer end for engaging the teeth of the clutch section on the engine shaft, said section being pinned to the crank, a collar on the crank adjacent to the clutch section, said collar having a housing extending over the clutch section and of a length to cover the teeth thereof, said collar having a cam portion at the opposite side from the housing, a cam portion pinned to the crank in spaced relation to the cam portion of the collar, said cam portions having notches, each notch having one end wall perpendicular to the bottom of the notch and the other end wall inclined to the bottom of the notch, the notches of the cam portions being symmetrical, a ratchet wheel journaled on the crank between the cam portions, said wheel having a hub provided at each end with projections fitting the notches of the adjacent cam portion, a pawl pivoted to a fixed support and engaging the teeth of the ratchet wheel to prevent reverse rotation thereof, interengaging stops on the first-named collar and the ratchet wheel for limiting the reverse motion of the collar with respect to the ratchet wheel, a spring arranged between the stops and acting normally to hold the ratchet wheel with the projections in the notches, and a spring arranged between the last-named cam portion and a fixed support and normally pressing the crank away from the engine shaft.

3. The combination with an engine shaft having a clutch section provided with teeth at its outer end, of a starting crank having a clutch section provided with teeth at its outer end for engaging the teeth of the clutch section on the engine shaft, said section being pinned to the crank, a collar on the crank adjacent to the clutch section, said collar having a housing extending over the clutch section and of a length to cover the teeth thereof, said collar having a cam portion at the opposite side from the housing, a cam portion pinned to the crank in spaced relation to the cam portion of the collar, said cam portions having notches, each notch having one end wall perpendicular to the bottom of the notch and the other end wall inclined to the bottom of the notch, the notches of the cam portions being symmetrical, a ratchet wheel journaled on the crank between the cam portions, said wheel having a hub provided at each end with projections fitting the notches of the adjacent cam portion, a pawl pivoted to a fixed support and engaging the teeth of the ratchet wheel to prevent reverse rotation thereof, means for limiting the reverse movement of the collar with respect to the ratchet wheel, means for returning the parts to original position, and a spring normally pressing the crank away from the engine shaft.

4. The combination with an engine shaft having a clutch section provided with teeth at its outer end, of a starting crank having a clutch section provided with teeth at its outer end for engaging the teeth of the clutch section on the engine shaft, said section being pinned to the crank, a collar on the crank adjacent to the clutch section, said collar having a housing extending over the clutch section and of a length to cover the teeth thereof, said collar having a cam portion at the opposite side from the housing, a cam portion pinned to the crank in spaced relation to the cam portion of the collar, said cam portions having notches, each notch having one end wall perpendicular to the bottom of the notch and the other end wall inclined to the bottom of the notch, the notches of the cam portions being symmetrical, a ratchet wheel journaled on the crank between the cam portions, said wheel having a hub provided at each end with projections fitting the notches of the adjacent cam portion, and a pawl pivoted to a fixed support and engaging the teeth of the ratchet wheel to prevent reverse rotation thereof.

5. The combination with the engine shaft having a clutch section, of a starting crank having a clutch section rigid therewith for coöperating with the section of the engine shaft, said sections engaging and disengaging by axial movement of the crank, a ratchet wheel on the crank, a pawl pivoted to a fixed support and engaging the wheel to prevent reverse movement thereof, means on the ratchet wheel for engaging the crank to move the said crank longitudinally away from the engine shaft when the crank is rotated reversely with respect to the pawl, yielding means normally pressing the crank away from the engine shaft, means for limiting the reverse movement of the crank with respect to the ratchet wheel, yielding means for returning the parts to their normal position, and means actuated by the movement of the ratchet wheel for moving the pawl into and out of engagement with the teeth thereof.

6. The combination with the engine shaft having a clutch section, of a starting crank having a clutch section rigid therewith for coöperating with the section of the engine shaft, said sections engaging and disengaging by axial movement of the crank, a ratchet wheel on the crank, a pawl pivoted to a fixed support and engaging the wheel to prevent reverse movement thereof, means on the ratchet wheel for engaging the crank to move the said crank longitudinally away from the engine shaft when the crank is rotated reversely with respect to the pawl, yielding means normally pressing the crank away from the engine shaft, means for limiting the reverse movement of the crank with respect to the ratchet wheel, and a yielding means for returning the parts to their normal position.

7. The combination with the engine shaft having a clutch section, of a starting crank having a clutch section rigid therewith for coöperating with the section of the engine shaft, said sections engaging and disengaging by axial movement of the crank, a ratchet wheel on the crank, a pawl pivoted to a fixed support and engaging the wheel to prevent reverse movement thereof, means on the ratchet wheel for engaging the crank to move the said crank longitudinally away from the engine shaft when the crank is rotated reversely with respect to the pawl, yielding means normally pressing the crank away from the engine shaft, and means for limiting the reverse movement of the crank with respect to the ratchet wheel.

JAMES DANIEL HOPWOOD.

Witnesses:
W. R. DILLON,
C. M. HALL.

Copies of this patent may be obtained for five cents each, by addressing the "Commissioner of Patents, Washington, D. C."